United States Patent

Scura

Patent Number: 5,287,765
Date of Patent: Feb. 22, 1994

[54] HAND ACTUATED CABLE DISPLACEMENT SYSTEM

[76] Inventor: Brian Scura, 13566 Yockey St., Garden Grove, Calif. 92644

[21] Appl. No.: 832,677

[22] Filed: Feb. 6, 1992

Related U.S. Application Data

[63] Continuation of Ser. No. 461,027, Jan. 4, 1990, abandoned.

[51] Int. Cl.5 .......................... F16C 1/10; G05G 11/00
[52] U.S. Cl. ...................................... 74/502.2; 74/489
[58] Field of Search ...................... 74/489, 502.2, 527, 74/529, 528

[56] References Cited

U.S. PATENT DOCUMENTS

| | | | |
|---|---|---|---|
| 2,854,857 | 10/1958 | Gleasman et al. | 74/489 |
| 4,005,613 | 2/1977 | Kaufman et al. | 74/489 |
| 4,084,449 | 4/1978 | Kine | 74/489 X |
| 4,304,146 | 12/1981 | Ueda | 74/489 |
| 4,611,500 | 9/1986 | Nagano | 74/489 |
| 4,667,785 | 5/1987 | Toyoda et al. | 74/529 X |
| 4,903,799 | 2/1990 | Romano | 74/502.2 X |

FOREIGN PATENT DOCUMENTS

| | | | |
|---|---|---|---|
| 960276 | 4/1950 | France | 74/489 |
| 1025981 | 4/1953 | France | 74/489 |
| 49-36186 | 2/1974 | Japan | 74/489 |
| 50-64935 | 2/1975 | Japan | 74/489 |
| 51-132741 | 6/1975 | Japan | 74/489 |
| 54-19004 | 7/1979 | Japan | 74/489 |

*Primary Examiner*—Vinh T. Luong

[57] ABSTRACT

A hand actuated link cable or piston displacement system utilizes a four-bar linkage system attached to a hand-operated lever. The four-bar linkage system is connected by bolts that permit pivotal movement and enable the hand-operated lever to move with little or no longitudinal travel relative to the longitudinal axis of displacement. Adjustments to the lever's angle of operation can be made, as well as adjustments to the power ratio of the system, for applying force.

24 Claims, 3 Drawing Sheets

HAND ACTUATED CABLE DISPLACEMENT SYSTEM

This is a continuation of application Ser. No. 461,027, filed on Jan. 4, 1990.

BACKGROUND OF THE INVENTION

1. Field of the Invention

The present invention is directed to an apparatus for displacing a cable or piston by means of a hand operated lever and, more particularly, to a multiple linkage cable or piston displacement system.

2. Description of Related Art

It is well known within the bicycle and motorcycle industry to use lever operated brakes and clutches. Systems that use levers having a single pivot to pull on a cable are well known. Four-bar linkage systems have been attempted as well in cable displacement systems. However, considerable improvement is still needed in such systems to provide improved performance in the power ratio of lever movement to cable displacement. Moreover, there is a need for adjustable, hand actuated cable displacement systems in which the angle of operation of the lever can be adjusted to accommodate individual desires.

Japanese Utility Model Publication No. Sho 54-19004 discloses a four-bar linkage system utilized on a bicycle hand brake system. The links, however, are not positioned to significantly reduce potential lateral movement. That is, the lever can move laterally along the axis of the force application and away from its support bracket because the links in the mechanism are aligned essentially next to each other so that the lever must pivot around the two pivot points of the links on the support member.

OBJECTS AND SUMMARY OF THE INVENTION

An object of the present invention is to provide an improved adjustable hand operated cable or piston displacement system useable with either a clutch or braking system for bicycles or motorcycles. Another object of the invention is to provide an ergonomically designed, hand operated lover mechanism having means to adjust the reach and angle of the lever, as well as the input-to-output power ratio, thus creating a more efficient displacement system that reduces muscle fatigue.

These objects and the general purpose of this invention are accomplished by the modified four-bar linkage design of the present displacement system. This displacement system incorporates a means for adjusting the initial angle, the rate of angle change, the lever reach, and the power ratio of the displacement system.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings, in which like reference numerals designate like parts thereof.

DESCRIPTION OF THE PREFERRED EMBODIMENTS

The following description will enable a person of skill in this art to make and use the invention, and it sets forth the best modes contemplated by the inventor of carrying out his invention. Various modifications, however, will remain apparent to those skilled in the art, since the generic principles of the present invention have been defined specifically to provide a relatively easily manufactured cable or piston displacement system for bicycles or motorcycles.

Figure 1:
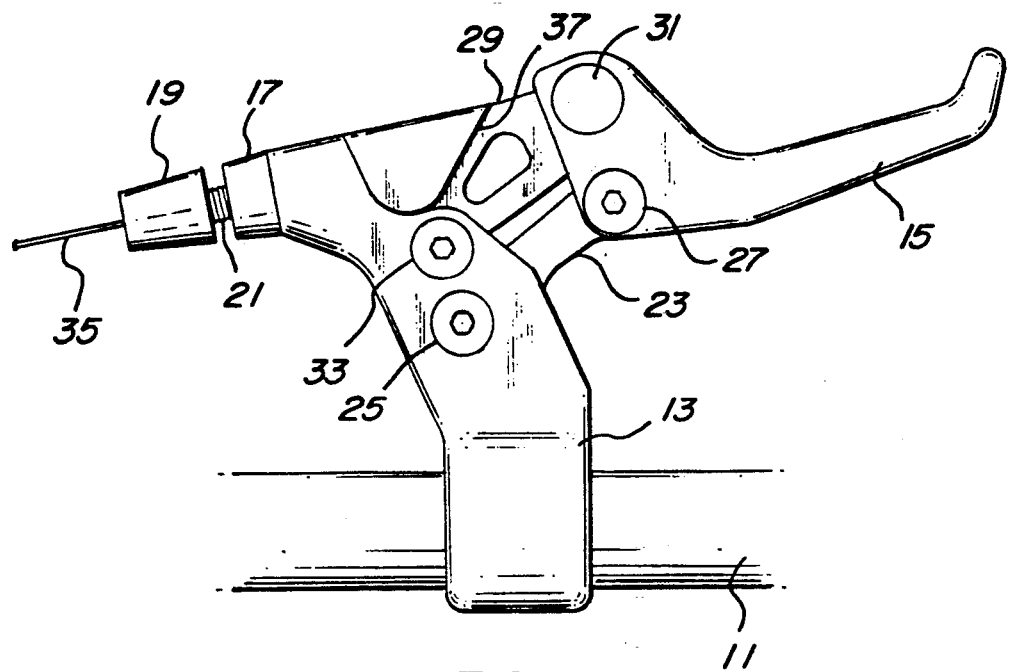
FIG. 1 is a side view assembly of the displacement system as seen in its nonactuated position.

FIG. 1 shows a hand actuated cable displacement system according to the present invention being used as brake levers on a bicycle. Accordingly, the support bracket of the displacement system is attached to the handlebar 11, which serves as the support structure for the entire mechanism. Support bracket 13 is attachable to handlebar 11 usually at a linear section thereof by any well-known, convenient means such as set screws or bolts (not illustrated).

The support bracket 13 contains a standard nozzle adjustment mechanism which includes the cone-shaped sleeve 19. The cone-shaped sleeve 19 threads into support bracket 13 by an external threaded cylinder 21. Lock ring 17 threads onto external threaded cylinder 21, allowing it to be extended further away from the body of support bracket 13 or closer to the body of support bracket 13, as desired. Cable 35 passes through the cone-shaped sleeve 19, the upper part of support bracket 13, and attaches to a first, or upper link 29 at attachment area 37 in a manner that will be more fully explained hereinafter.

A second, or lower link 23, which is essentially a rectangular bar linkage, is mounted to support bracket 13 at a lower pivot point 25, which is illustrated as a hexagon socket flat-head cap screw. The second end link 23 is pivotally mounted to lever handle 15 at location 27, which is also illustrated as being a hexagon socket flat-head cap screw.

The first link 29 is attached to the support bracket 13 at location 33 by a hexagon socket flat-head cap screw. The second end of link 29 is attached to the hand actuatable lever 15 at location 31 which, for the present, shall be described as a pivot point just like the pivot points at locations 27, 33, and 25. As will be explained hereinafter, pivot point 31 may also be adjustable, thereby providing some of the additional desirable features of the present invention.

The displacement mechanism illustrated in FIG. 1 is shown in the closed or unactuated position, wherein the tension on cable 35 is relatively low, thereby not actuating the braking mechanism to which cable 35 may be attached (not shown).

Figure 2:
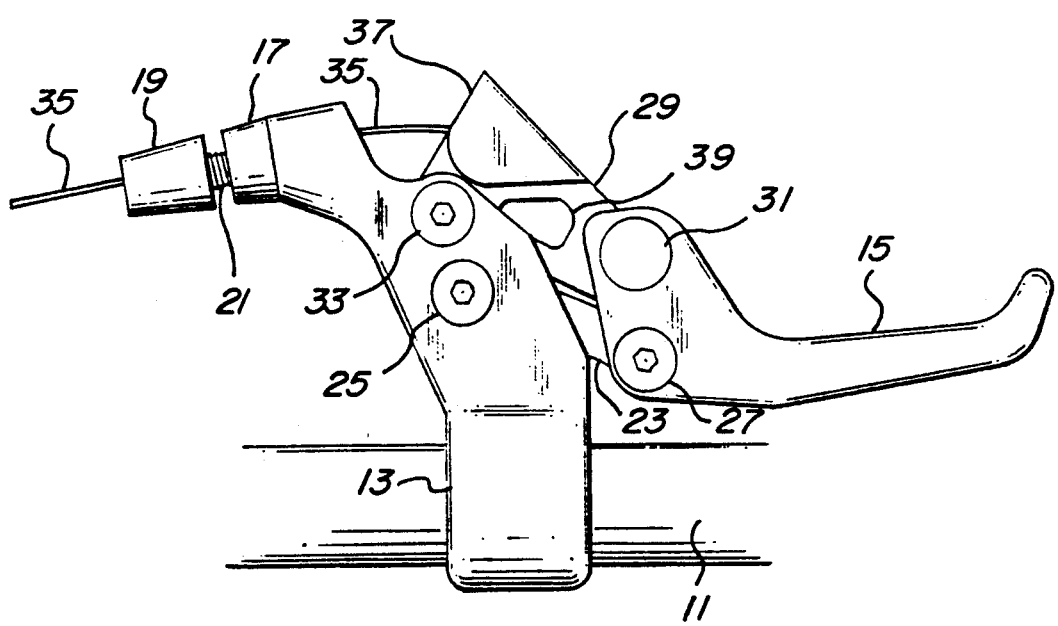
FIG. 2 is a side view assembly of the displacement system in an actuated position.

As a point of contrast, FIG. 2 illustrates the same displacement mechanism in a fully open or actuated position. As a result of this movement, the cable 35 that is attached to area 37 on the first link 29 has been pulled to the right. This increases the tension on the cable and actuates whatever mechanism the cable may be attached to. As can be seen by the position of lever 15 and its fully open actuated position, as compared to its fully closed position of FIG. 1, the lever has moved essentially in an almost straight downward direction with very little, if any, lateral displacement to the right, away from support bracket 13. This unique movement of handle 15 is due to the four-bar linkage system of the present invention made up by the first link 29 and the second link 23, and the manner in which these links are pivotally attached to the support bracket 13 and the hand actuated lever 15.

This almost directly downward travel of the lever 15 is highly desirable because it increases the level of comfort of the user by reducing muscle fatigue that can occur as a result of extended use. Moreover, translation of cable displacement into a lover movement can considerably reduce lateral travel and permit increased power application to the cable displacement system.

The links 29 and 23 of the present invention are located one on top of the other. In other words, the first linkage 29 is located on top of the second linkage 23, and they are essentially parallel. The result is that lever 15 has very little arcuate movement and, instead, moves almost directly down towards the handlebar.

Through computer-simulated testing, it has been found that a conventional single pivot point handlebar brake actuator mechanism, under a constant 100-pound (45.4 kg) pulling force, will exert 173 pounds (78.5 kg) of force on the cable when in a closed position, 241 pounds (109.3 kg) of force on a cable when in a half open position, and 315 pounds (142.9 kg) of force on a cable when fully open. In contrast, the four-bar linkage system of the present invention, as illustrated in FIGS. 1 and 2, under the same conditions of a constant 100-pound (45.4 kg) force on lever 15, will exert 251 pounds kg) of cable pulling force when in a closed position, as shown in FIG. 1, 297 pounds (134.7 kg) of cable pulling force in the half open position (not shown), and 387 pounds (175.5 kg) of cable pulling force when in the fully open position, as shown in FIG. 2. Thus, considerably more force is generated by the present four-bar linkage system than that of the prior art displacement systems for the same hand force. This allows the user to exert less force during braking to accomplish the same result.

Figure 3:
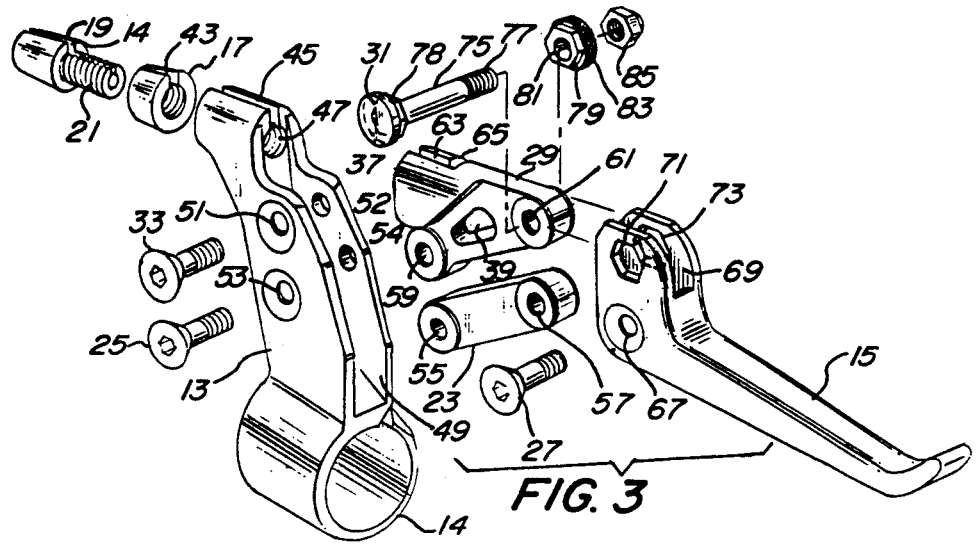
FIG. 3 is an exploded side perspective of the displacement system showing each of the individual parts.

Referring now to FIG. 3, an exploded view of a preferred embodiment of a four-bar linkage mechanism according to the present invention is shown, along with a preferred lever adjustment mechanism. The support bracket 13 is more clearly illustrated as having a vertical slot 49 therein with an internally threaded channel 47 at the upper end having a horizontal slot 45 for receiving the cable to be pulled (not shown). Hollow threaded cylinder 21 threads into internally threaded channel 47. A lock ring 17 threads over threaded cylinder 21. Both the cone-shaped sleeve 19 and adjustment ring 17 contain slots 19 and 43, respectively, for allowing placement of a cable directly into the channel created thereby, all as is well known in the prior art.

The other end of support bracket 13 utilizes a closed clamp mechanism 14 of the kind well known in the prior art to attach the support bracket to a round pipe such as a handlebar. Located on support bracket 13 and passing through a vertical slot 49 of the support bracket are two pivot axes. These axes are defined by apertures 51, 52, which constitute the upper pivot axis, and apertures 53, 54, which constitute the lower pivot axis. As can be seen, these pivot axes are located one above the other, almost in a direct vertical line. Aperture 51 receives a hexagon socket flat-head cap screw 33. Aperture 52 may be internally threaded to receive the threaded end of bolt 33. Likewise, aperture 53 receives the hexagon socket flat-head cap screw 25. Aperture 54, on the other side of slot 49, may be internally threaded to receive the pivot end of bolt 25. Bolt 33 and bolt 25 make up the pivot shafts for the first bar linkage 29 and the second bar linkage 23, respectively.

First bar linkage 29 has an aperture 59 at its first end and an aperture 61 at its second end. Aperture 59 at the first end is sized to receive bolt 33 after it passes through aperture 51 in support bracket 13. This is accomplished only after the first link 29 is slipped into vertical slot 49 to align with apertures 51 and 52, so that aperture 59 aligns with apertures 51 and 52 of support bracket 13. Bolt 33 thereby acts as the pivot shaft for the first end of first link 29.

The second link 23 likewise has a first end having an aperture 55 thereat which, when aligned with apertures 53 and 54 in support bracket 13, receives bolt 25, which then acts as the pivot shaft for the first end of link 23. When links 29 and 23 are placed into the support bracket 13 structure, the pivot shafts at the first end of links 29 and 23, respectively, are parallel and aligned, so that the links 29 and 23 are one on top of the other.

The first link 29 also has a cable connecting section 37 which, as is well known in the art, through horizontal slot 63 and vertical slot 65, receives the connecting end of a pull cable (not shown). The first link 29, which is located above the second link 23, is shaped more or less like a triangle, with its first pivot aperture 59 located at one point of the base, the cable connecting slots 63, 65 located at the other point of the base, and pivot aperture 61 for the hand actuated lever 15 located at its apex. Because of this triangular shape, it may be desirable to lighten first linkage 29 by removing the center portion thereof placing an aperture therein.

The second end of the bottom or second linkage 23 has a pivot aperture 57 therethrough which, in assembly, aligns with aperture 67 in lever 15 by slipping second linkage 23 into the vertical slot 69 in lever 15. When so aligned, bolt 27 holds the second or bottom linkage 23 pivotally to handle 15. The top linkage 29 also slips into slot 69 of handle 15 to align the pivotal aperture 61 at its second end with apertures 71 and 73 of the lever 15.

Apertures 71 and 73 are shown as hexagonal apertures that are specifically adapted to receive the hexagonal bosses 78 and 79 located on bolt 31 and adjusting mechanism 83, respectively. Bolt 31, having pivotal shaft 75 and threaded end 77, fits through hexagonal aperture 71 and pivoting aperture 61 on the top link 29 and hexagonal aperture 73 when top link 29 is slipped into slot 69 of handle 15. Adjusting mechanism 83 with hexagonal boss 79 thereon slips into hexagonal slot 73. Nut 85 threadably engages the threads 77 on bolt 31 to hold bolt 31 fast to lever 15.

Particular attention should be paid to the fact that aperture 81 is located within the hexagonal boss 79 of adjusting mechanism 83 is located asymmetrically. In other words, aperture 83 is located off center within one of the corners of the hexagon of boss 79. Shaft 75 of bolt 31 is likewise located off-center. Thus, by moving bolt 31 and adjusting mechanism 83 within hexagonal apertures 71 and 73, respectively, handle 15 is effectively moved around the pivot axis in pivot aperture 61 of the first link 29, in discrete steps.

Figure 4:
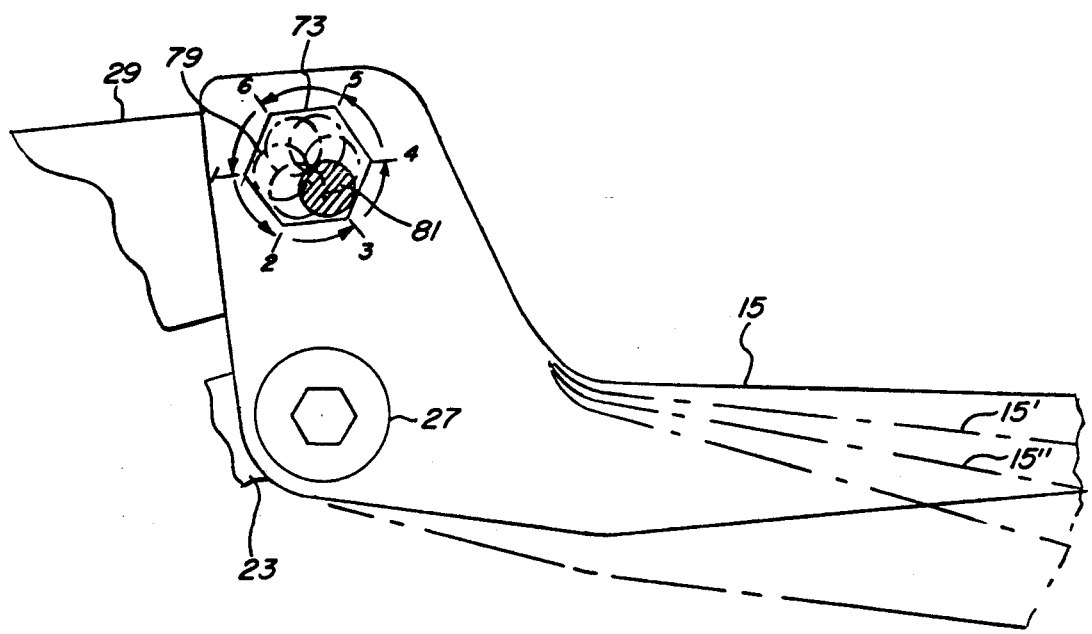
FIG. 4 is a schematic illustration of the displacement system showing how the lever is adjusted.

The operation of the adjusting mechanism 83 as shown in FIG. 3 is schematically illustrated in FIG. 4. Top linkage 29 is partially shown as attached to handle 15 by the adjusting mechanism. Bottom linkage 23 is partially shown as attached to handle 15 or pivot axis 27. The bolt receiving aperture 81 in hexagonal boss 79 is shown as located at apex 5 of the hexagonal aperture 73. The shaft 75, which is attached to hexagonal boss 78 of bolt 31, is located in aperture 81.

Assuming location of the adjuster in position 1, and a constant 100-pound (45.4 kg) force pulling on the handle, a cable pulling force of approximately 251 pounds (113.8 kg) is produced by the mechanism at the closed position. At a half open position, cable pulling force is approximately 297 pounds (134.7 kg). At a fully open position, cable pulling force is approximately 387 pounds (175.5 kg).

Assuming that the adjusting mechanism 83 is moved to position 2, the angle between the lever and the handlebars is 15.4 degrees. To reach a fully open position, the lever will move 9.8 degrees. With a 100-pound (45.4 kg) constant load on the lever at a closed position, the cable pulling force is 224 pounds (101.6 kg). At a half open position, the cable pulling force is 272 pounds (123.4 kg). At a fully open position, the cable pulling force will be 351 pounds (159.2 kg).

Assuming that the adjusting mechanism 83 is now moved to position 3, the lever makes an angle of 23 degrees with the handlebars at a fully closed position. A fully open position will be reached by going through a 9.8 degree change in position. With a constant 100-pound (45.4 kg) force on the lever, a closed position, the cable pulling force is 222 pounds (100.7 kg). At a half open position, the cable pulling force is 270 pounds (122.5 kg). At a fully open position, the cable pulling force is 350 pounds (158.8 kg).

Assuming now that the handle adjusting mechanism is moved to position 4, the lever makes an angle of 28 degrees with the handlebars in a fully closed position. To reach a fully open position, the lever must move through 15.4 degrees of travel. With a 100-pound (45.4 kg) constant force on the lever, in the closed position, the cable pulling force is 245 pounds (111.1 kg). In a half open position, it is 294 pounds (133.4 kg). In a fully open position, it is 385 pounds (174.6 kg).

Assuming now that the lever adjusting mechanism is moved to position 5, the lever makes an angle of 25.4 degrees with the handlebars in a fully closed position, and must travel through a 19.5 degree change to reach a fully open position. With a 100-pound (45.4 kg) constant force on the lever in a closed position, it exerts 266 pounds (120.6 kg) of cable pulling force. In a half open position it exerts 314 pounds (142.4 kg) of cable pulling force. In a fully open position it exerts 411 pounds (186.4 kg) of cable pulling force.

Assuming now that the lever adjusting mechanism is moved to position 6, the lever makes an angle of 19.2 degrees with the handlebars, and it must move through a 19.5 degree change to reach its fully open position. In the closed position, with a 100-pound (45.4 kg) constant force on the lever, the closed cable pulling force is 269 pounds (122 kg). The half open position cable pulling force is 316 pounds (143.3 kg). The fully open position cable pulling force is 412 pounds (186.9 kg).

Accordingly, it can be seen that the adjusting mechanism illustrated in FIG. 4 allows for considerable adjustability in initial position, pulling force, and angular displacement to fit the individual requirements of each rider.

Figure 5:
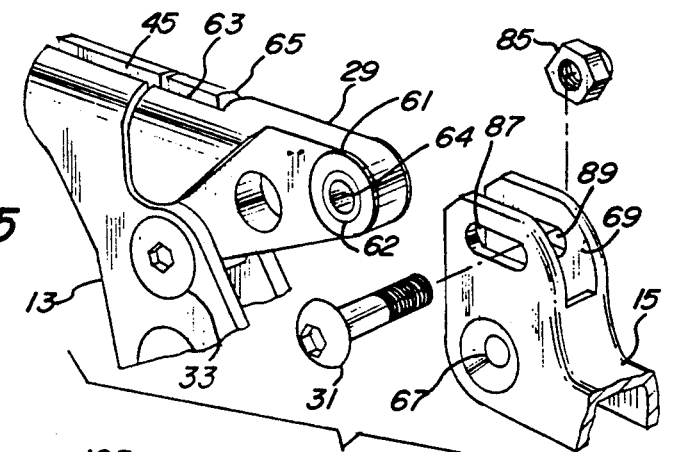
FIG. 5 is a partial exploded view of the displacement system showing an alternate preferred lover adjusting mechanism.

FIG. 5 illustrates an alternate preferred adjusting mechanism which is simpler in construction and more limited in the degree of adjustability. Rather than utilizing a hexagonal aperture as in FIG. 3, adjustment is accomplished through an oblong slot arrangement 87, 89. The bushing 62, which rotates within pivot aperture 61 of top link 29, is slightly wider than top link 29. Bolt 31 passes through aperture 64 in bushing 62. Bolt 31 is permitted to slide back and forth along slots 87, 89 after nut 85 is loosened. This permits the handle 15 to change its initial angle with the handlebar in the closed position, as well as the degrees of travel from a closed to a fully open position. When nut 85 is tightened, bolt 31 tightens lever 15 to bushing 62, allowing it to rotate in aperture 61.

Figure 6:
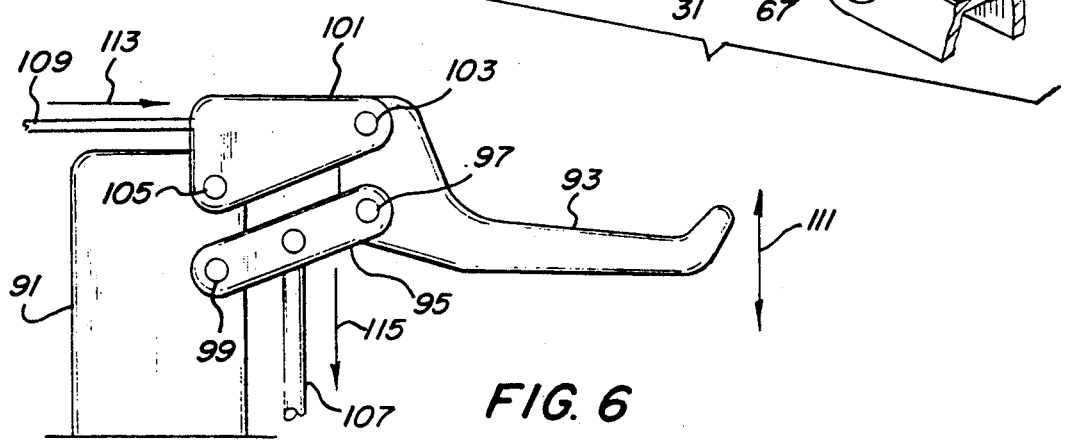
FIG. 6 is an abstracted illustration of the basic working parts of the present invention.

Referring now to FIG. 6, the basic elements of the four-bar linkage system according to the present invention are illustrated in block form. A support base 91 supports a top linkage 101 by way of rotary bearing 105. Base 91 supports a lower link 95 by way of rotary bearing 99. The handle 93 is attached to both the upper link 101 and the lower link 95 in a manner that places one link above the other, rather than one link side by side with the other, as in the prior art. Handle 93 attaches to the upper link at rotary bearing 103 and to a lower link 95 at rotary bearing 97. As a result of this four-bar linkage mechanism, handle 93 effectively moves up and down in direction 111. This mechanism can be utilized to either pull on cable 109 or push on a piston 107. As shown in FIG. 6, a cable 109 may be attached to the upper link 101 at the base of the triangle of link 101 that is the corner opposite to the location of bearing 105. By moving the handle down in direction 111, a tension force 113 is exerted on cable 109, pulling it in the direction of 113. This mechanism, as illustrated above, provides not only a considerable mechanical advantage, but also reduces, to a great extent, the fatigue experienced by the human operator as a result of the singular movement of the lever 93.

If it is desired to activate a piston or shaft, that is, a motion-transmitting device in a pushing motion, it is possible to attach a shaft or piston 107 to lower link 95, as shown. Upon movement of handle 93 downward in the direction 111, the piston 107 is moved downward as well as in direction 115.

Besides the particular embodiments illustrated, other ways of utilizing the four-bar linkage illustrated may be devised by those of ordinary skill in the art. Such schemes should be considered as within the scope of the invention as defined by the appended claims.

What is claimed is:

1. An improved hand-operated, four-bar linkage lever mechanism in combination with a cable;
    said improved hand-operated, four-bar linkage lever mechanism comprising:
    a bracket attachable to a handlebar structure for support,
    a hand-actuable lever moving with respect to said bracket,
    a first link having a first end and a second end, with said first end pivotally attached to said bracket at a first pivot axis and said second end pivotally attached to said hand-actuable lever at a second pivot axis;

a second link having a first end and a second end, with said first end pivotally attached to said bracket at a third pivot axis and said second end pivotally attached to said hand-actuable lever at a fourth pivot axis, the improvement therein comprising:

means for directly attaching said cable to said first link at a position offset from said first pivot axis and said second pivot axis, whereby a force applied to said hand-actuable lever will be transferred to said cable.

2. The improved hand-operated, four-bar linkage lever mechanism of claim 1, further comprising:

means to continuously position said second link between said first link and said handlebar structure throughout the operative range of movement of said first link and said second link.

3. The improved hand-operated, four-bar linkage lever mechanism of claim 2, wherein said first link provides a triangular arrangement comprised of a first vertex, a second vertex, and a third vertex, said first vertex being located at said first pivot axis, and said second vertex being located at said second pivot axis, and said third vertex being located at said means for directly attaching said cable to said first link.

4. An improved hand-operated, four-bar linkage lever mechanism in combination with a cable;

said improved hand-operated, four-bar linkage lever mechanism comprising:

a bracket attachable to a handlebar structure for support, a hand-actuable lever moving with respect to said bracket, a first link being pivotally attached to said bracket at a first pivot axis and pivotally attached to said hand-actuable lever at a second pivot axis, a second link being pivotally attached to said bracket at a third pivot axis and pivotally attached to said hand-actuable lever at a fourth pivot axis, the improvement therein comprising:

means for directly attaching said cable to said first link at a position offset from said first pivot axis and said second pivot axis, whereby a force applied to said hand-actuable lever will be transferred to said cable, and means to continuously position said second link between said first link and said handlebar structure throughout the operative range of movement of said first link and said second link.

5. The improved hand-operated, four-bar linkage lever mechanism of claim 51, wherein said first link provides a triangular arrangement comprised of a first vertex, a second vertex, and a third vertex, said first vertex being located at said first pivot axis, and said second vertex being located at said second pivot axis, and said third vertex being located at said means for directly attaching said cable to said first link.

6. An improved hand-operated, four-bar linkage lever mechanism comprising:

a bracket attachable to a handlebar structure for support, a hand-actuable lever having a first aperture and a second aperture, a first link having a first aperture and a second aperture, with said first aperture being pivotally attached to said bracket at a first pivot axis and said second aperture being pivotally attached to said first aperture of said hand-actuable lever at a second pivot axis, a second link having a first aperture and a second aperture, with said first aperture being pivotally attached to said bracket at a third pivot axis and said second aperture being pivotally attached to said second aperture of said hand-actuable lever at a fourth pivot axis, the improvement therein comprising:

means to manually adjust the position of said handle-actuable lever relative to said bracket while said first link is static, wherein said means causes the center of said first aperture of said hand-actuable lever to orbit around the center of said second aperture of said first link.

7. The improved hand-operated, four-bar linkage lever mechanism of claim 6, wherein said means comprises:

a shaft riding within said second aperture of said first link, and extending through said first aperture of said hand-actuable lever, and an eccentrically located boss at the end of said shaft which is received by said first aperture of said hand-actuable lever.

8. The improved hand-operated, four-bar linkage lever mechanism of claim 7, wherein a detent means to restrain rotation of said eccentrically located boss is located in said first aperture of said hand-actuable lever.

9. The improved hand-operated, four-bar linkage lever mechanism of claim 8, wherein said eccentrically located boss is of a polygonal shape, and said first aperture of said hand-actuable lever is of a polygonal shape capable of receiving and restraining rotation of said eccentrically located boss in multiple positions.

10. The improved hand-operated, four-bar linkage lever mechanism of claim 6 wherein said manually-adjustable means comprises:

a shaft riding within a bearing located in one of said links, said shaft extending through a slot located in an adjoining link, thereby permitting said shaft to move within said slot, and means to selectively fasten said shaft to said link containing said slot at any point along said slot.

11. The improved hand-operated, four-bar linkage lever mechanism of claim 6, wherein said manually-adjustable means comprises:

a shaft passing through a sleeve, said sleeve riding within a bearing located in one of said links, said shaft extending through a slot located in an adjoining link, thereby permitting said shaft to move within said slot, and means for said shaft to selectively fasten said link containing said slot to said sleeve at any point along said slot.

12. An improved hand-operated, four-bar linkage lever mechanism in combination with a piston;

said improved hand-operated, four-bar linkage lever mechanism comprising:

a bracket attachable to a handlebar structure for support, a hand-actuable lever moving with respect to said bracket, a first link having a first end and a second end, with said first end pivotally attached to said bracket at a first pivot axis and said second end pivotally attached to said hand-actuable lever at a second pivot axis;

a second link having a first end and a second end, with said first end pivotally attached to said bracket at a third pivot axis and said second end pivotally attached to said hand-actuable lever at a fourth pivot axis, the improvement therein comprising:

means for directly attaching said piston to said second link at a position offset from said third pivot axis and said fourth pivot axis, whereby a force applied to said hand-actuable lever will be transferred to said piston.

13. The improved hand-operated, four-bar linkage lever mechanism of claim 12, further comprising:

means to continuously position said second link between said first link and said handlebar structure throughout the operative range of movement of said first link and said second link.

14. The improved hand-operated, four-bar linkage lever mechanism of claim 13, wherein said second link provides a triangular arrangement comprised of a first vertex, a second vertex, and a third vertex, said first vertex being located at said third pivot axis, and said second vertex being located at said fourth pivot axis, and said third vertex being located at said means for directly attaching said piston to said second link.

15. An improved hand-operated, four-bar linkage lever mechanism in combination with a piston;

said improved hand-operated, four-bar linkage lever mechanism comprising:

a bracket attachable to a handlebar structure for support, a hand-actuable lever moving with respect to said bracket, a first link being pivotally attached to said bracket at a first pivot axis and pivotally attached to said hand-actuable lever at a second pivot axis, a second link being pivotally attached to said bracket at a third pivot axis and pivotally attached to said hand-actuable lever at a fourth pivot axis, the improvement therein comprising:

means for directly attaching said cable to said second link at a position offset from said first pivot axis and said fourth pivot axis, whereby a force applied to said hand-actuable lever will be transferred to said piston, and means to continuously position said second link between said first link and said handlebar structure throughout the operative range of movement of said first link and said second link.

16. The improved hand-operated, four-bar linkage lever mechanism of claim 15, wherein said second link provides a triangular arrangement comprised of a first vertex, a second vertex, and a third vertex, said first vertex being located at said third pivot axis, and said second vertex being located at said fourth pivot axis, and said third vertex being located at said means for directly attaching said piston to said second link.

17. An improved cable displacement system including a bracket attachable to a support member and a hand-actuable lever moving with respect to said bracket, the improvement therein comprising:

a first link having a first end and a second end with said first end pivotally attached to said bracket and said second end pivotally attached to said lever;

a second link having a first end and a second end with said first end pivotally attached to said bracket and said second end pivotally attached to said lever so that said first and second links are located one on top of the other;

a shaft riding within a bearing located at the second end of said first link, said shaft extending through an aperture in said lever at the point of attachment to said first link, and a manually adjustable means at the second end of said first link for adjusting the relative location of the pivot at the second end of said first link, including:

a detent means for providing detent locations, located in the aperture of said lever pivotally receiving said shaft, for moving said lever with respect to said support member in respect to angle and distance therefrom;

a polygonal boss having an aperture asymmetrically located therethrough for receiving said shaft, said aperture in said lever being polygonal and said polygonal boss fitting within the mating polygonal aperture in said lever, whereby rotation of the boss with respect to the polygonal aperture moves said lever eccentrically around said shaft, and means for selectively fastening said shaft to said lever at any one of the detent locations.

18. An improved displacement system including a bracket attachable to a handlebar structure for support and a hand-actuable lever moving with respect to said bracket, the improvement therein comprising:

a first link having a first end and a second end with said first end pivotally attached to said bracket and said second end pivotally attached to said lever;

a second link having a first end and a second end with said first end pivotally attached to said bracket and said second end pivotally attached to said lever so that said first and second links are located one on top of the other;

a cable passing through an aperture in said bracket and connected to the first link so that when said lever moves with respect to said bracket the cable is pulled, said first link being triangular in shape with its apex being its second end, and said cable attaching to a base of the triangle, which is the first end, vertically displaced from the pivotal connection of the first end to the bracket, and a manually adjustable means at the second end of said first link for adjusting the relative location of the pivot at the second end of said first link to vary a distance between said pivotal attachments of said first link and a distance between said pivotal attachment of said first link to said lever and said pivotal attachment of said second link to said lever.

19. An improved displacement system including a bracket attachable to a structure and a hand actuable lever moving with respect to said bracket, the improvement therein comprising:

a first link having a first end and a second end with said first end pivotally attached to said bracket and said second end pivotally attached to said lever;

a second link having a first end and a second end with said first end pivotally attached to said bracket and said second end pivotally attached to said lever so that said first and second links are located one on top of the other; and
  a manually adjustable means at the second end of said first link for adjusting the relative location of the pivot at the second end of said first link to vary a distance between said pivotal attachment of said first link to said lever and said pivotal attachment of said second link to said lever, including
  a shaft riding within a bearing located at the second end of said first link, said shaft extending through an aperture in said lever at the point of attachment to said first link,
  a detent means located in the aperture of said lever pivotally receiving said shaft for moving said handle with respect to said support member in respect to angle and distance therefrom; and
  means for selectively fastening said shaft to said lever at any one of the detent locations.

20. An improved displacement system including a bracket attachable to a structure and a hand actuable lever moving with respect to said bracket, the improvement therein comprising:
  a first link having a first end and a second end with said first end pivotally attached to said bracket and said second end pivotally attached to said lever;
  a second link having a first end and a second end with said first end pivotally attached to said bracket and said second end pivotally attached to said lever so that said first and second links are located one on top of the other; and
  a cable passing through an aperture in said bracket and attached to the first link so that when said lever moves with respect to said bracket the cable is pulled, wherein said first link being triangular in shape with its apex being its second end, and said cable attaching to a base of the triangle, which is the first end, vertically displaced from the pivotal connection of the first end to the bracket, and
  a manually adjustable means at the second end of said first link for adjusting the relative location of the pivot at the second end of said first link to vary a distance between said pivotal attachment of said first link to said lever and said pivotal attachment of said second link to said lever.

21. The improved displacement system of claim 20 wherein said second link is oblong in shape.

22. The improved displacement system of claim 20 wherein said second link is displaced from and below said first link.

23. The improved displacement system of claim 20 wherein said manually adjustable means comprises:
  a shaft riding within a bearing located at the second end of said first link, said shaft extending through an aperture in said lever at the point of attachment to said first link;
  a detent means located in the aperture of said lever pivotally receiving said shaft for moving said lever with respect to said support structure in respect to angle and distance therefrom; and
  means for selectively fastening said shaft to said lever at any one of the detent locations.

24. The improved displacement system of claim 20 wherein said second link is oblong in shape.

* * * * *